United States Patent [19]
Vargas et al.

[11] Patent Number: 5,975,374
[45] Date of Patent: Nov. 2, 1999

[54] DEPOSITOR APPARATUS

[75] Inventors: Gregory C. Vargas, White Bear Lake; Jimmy A. DeMars, Hugo; James S. Thorson, Scandia, all of Minn.

[73] Assignee: The Pillsbury Company, Minneapolis, Minn.

[21] Appl. No.: 08/962,802

[22] Filed: Nov. 3, 1997

[51] Int. Cl.⁶ .............................................. B65D 88/54
[52] U.S. Cl. ...................... 222/252; 222/278; 118/314
[58] Field of Search ................................. 222/252, 254, 222/275, 278; 118/313, 314

[56] References Cited

U.S. PATENT DOCUMENTS

| | | | |
|---|---|---|---|
| Re. 31,393 | 9/1983 | Rosen | 43/56 |
| Re. 32,074 | 1/1986 | Bennett | 43/54 |
| 1,842,762 | 1/1932 | Menke | 222/252 |
| 2,262,640 | 11/1941 | Greer | 118/314 X |
| 2,814,261 | 11/1957 | Meagher et al. . | |
| 2,850,051 | 9/1958 | Rasmusson . | |
| 3,020,939 | 2/1962 | Donofrio . | |
| 3,177,846 | 4/1965 | Archer et al. . | |
| 3,342,145 | 9/1967 | Bruson . | |
| 4,076,482 | 2/1978 | Whetstone . | |
| 4,747,541 | 5/1988 | Morine et al. . | |
| 4,915,264 | 4/1990 | Curtis | 222/250 |
| 5,073,391 | 12/1991 | DeMars et al. . | |
| 5,277,338 | 1/1994 | Divall | 222/278 X |
| 5,279,854 | 1/1994 | Kendall et al. | 118/314 |
| 5,338,170 | 8/1994 | Hashimoto et al. . | |
| 5,377,727 | 1/1995 | Ueda et al. . | |
| 5,409,721 | 4/1995 | Rademaker . | |
| 5,445,674 | 8/1995 | DeMars . | |
| 5,517,904 | 5/1996 | Vargas et al. | 9/4 |
| 5,554,225 | 9/1996 | DeMars . | |

FOREIGN PATENT DOCUMENTS

| | | |
|---|---|---|
| 0 492 928 A1 | 12/1991 | European Pat. Off. . |
| 2 544 491 | 4/1983 | France . |
| 1187673 | 4/1970 | United Kingdom . |
| WO 95/24615 | 9/1995 | WIPO . |

Primary Examiner—Andres Kashnikow
Assistant Examiner—Sean P. O'Hanlon
Attorney, Agent, or Firm—Westman, Champlin & Kelly, P.A.

[57] ABSTRACT

An improved depositor apparatus for depositing material from a material source. The depositor apparatus including first and second dispensing assemblies having spaced-apart outlets. The first and second dispensing assemblies are reciprocally operated to alternately dispense material. A feed device is coupled to the first and second dispensing assemblies for supplying material from the material source to the first and second dispensing assemblies for discharge.

28 Claims, 12 Drawing Sheets

Fig. 3A — FILLING CYCLE
X - FILLING FOR DISPENSER 14
O - FILLING FOR DISPENSER 12

Fig. 3B — DISPENSING CYCLE
X - DISPENSING FOR DISPENSER 14
O - DISPENSING FOR DISPENSER 12
- - INTERRUPTION

DEPOSITOR APPARATUS

BACKGROUND OF THE INVENTION

The present invention relates to a depositor apparatus for dispensing measured units of material. In particular, the present invention relates to a depositor apparatus which dispenses material from spaced dispensers.

Depositors are known which meter and dispense material to a moving conveyor system. Typically, material from a hopper or feed reservoir is filled into a dispensing chamber for discharge. The dispensing chamber typically includes a reciprocating dispensing plunger operable within said chamber to force material from the chamber to dispense the material from the depositor. While the dispensing chamber is being filled with material from a hopper or feed reservoir, the dispensing plunger remains in a retracted position, such that no material is expunged from the depositor while the dispensing chamber is being filled. After the dispensing chamber is filled, then the dispensing plunger can operate to dispense a metered unit of material. Thus, the depositor must complete the metering and filling cycle prior to commencing the dispensing cycle. Thus, the rate at which measured units of material can be dispensed is limited by the rate at which the metering and filling cycles can take place and the dispensing rate.

There is a continuing effort to increase production rates of product; and, thus, there is an effort to increase the rate for depositing measured units of material onto a conveyor system. A system incorporating coordinated dual dispensing chambers where material is metered into a first dispensing chamber while other material is dispensed from a second separate dispensing chamber is disclosed in U.S. Pat. No. 3,342,145 to Brunson. Brunson discloses dual dispensing chambers coupled to a single discharge chamber having a discharge opening. A valve assembly rotates between the dual dispensing chambers to selectively connect a filled dispensing chamber with the single discharge chamber and discharge opening. Due to limitations in the operation of the valve assembly, time delays exist between the connection of respective dispensing chambers to the single discharge chamber thus limiting the rate at which material may be filled into the dispensing chamber and dispensed. In Brunson, the valve assembly essentially selectively forms a portion of the dispensing chamber when coupled to the discharge chamber and forms a portion of the filling chamber when the dispensing chamber is coupled to a filling chamber and thus pressure is exerted to the valve assembly tending to decrease operating efficiency of the valve assembly. Thus, it is desirable to provide an improved depositor assembly with increased speed, capacity and/or efficiency for metering and dispensing product.

SUMMARY OF THE INVENTION

The present invention relates to an improved depositor apparatus for depositing material from a material supply. The depositor apparatus includes first and second dispensing assemblies. The dispensing assemblies include first and second dispensing chambers having spaced-apart dispensing outlets. The first and second dispensing assemblies reciprocally operate to alternately dispense material. A feed device is coupled to the dispensing chambers of the first and second dispensing assemblies for supplying material from a material supply to the first and second dispensing assemblies.

DETAILED DESCRIPTION OF THE PREFERRED EMBODIMENTS

Figure 1:
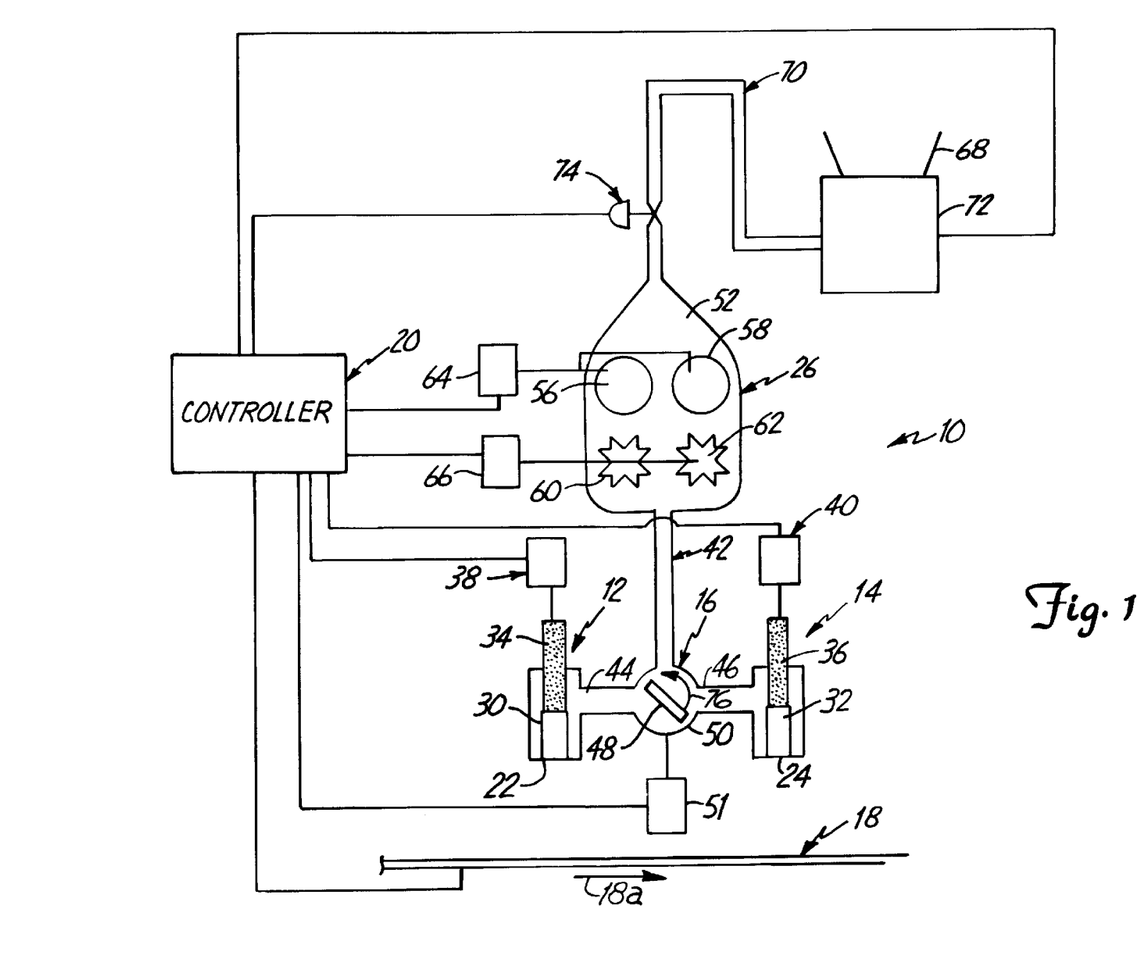
FIG. 1 is a schematic illustration of operation of an embodiment of a depositor apparatus of the present invention.

FIG. 1 is an illustrative view of an embodiment of a depositor apparatus 10 of the present invention. Depositor apparatus 10 includes first and second dispensing assemblies 12, 14, and a diverter assembly 16 (all shown diagrammatically). In one embodiment, material is metered and dispensed from the depositor apparatus 10 to a conveyor system 18, illustrated diagrammatically. The depositor apparatus 10 and conveyor system 18 are coupled to a central controller 20 for coordinating operation of the depositor apparatus 10 and conveyor system 18. Depositor apparatus 10 feeds material to first and second dispensing assemblies 12, 14 for discharge to the conveyor system 18.

The conveyor system 18 moves material discharged thereto along a conveying path in a conveying direction of movement as illustrated by arrow 18a. The first and second dispensing assemblies 12, 14 define first and second dispensing outlets 22, 24 located at spaced dispensing positions along the conveying path. A feed device 26 is coupled to the first and second dispensing assemblies 12, 14 via diverter assembly 16 to supply material to the first and second dispensing assemblies 12, 14.

The first and second dispensing assemblies 12, 14 include dispensing chambers 30, 32 (shown schematically), having reciprocating plungers 34, 36 (shown schematically) operable within the dispensing chambers 30, 32 to dispense material at dispensing outlets 22, 24. The reciprocating plungers 34, 36 are operable via plunger actuators 38, 40 operably coupled to the system controller 20. Preferably, plunger actuators 38, 40 are pneumatic cylinders, but can be any type of actuator such as an electro-mechanical actuator. Air pressure and timing of the cylinders are controlled via control system 20 to reciprocally operate the first and second dispensing assemblies 12, 14 to alternately dispense material from dispensing outlets 22, 24 in cooperation with operation of diverter assembly 16 which supplies material to the first and second dispensing assemblies 12, 14. The first and second dispensing assemblies 12, 14 dispense a similar measured unit of product to the conveyor 18 for providing an efficient and high-speed depositor apparatus 10. The air pressure and timing of the cylinders controls the velocity of the plungers and the shape of the deposited material and can be adjusted according to conveyor speed.

Operation of diverter assembly 16 is controlled by controller 20 to assure coordinated filling and dispensing operations for the first and second dispensing assemblies 12, 14. Feed line 42 connects feed device 26 to diverter assembly 16 and dispensing channels 44, 46 connect diverter assembly 16 to the first and second dispensing assembly 12, 14. Diverter assembly 16 includes a diverter member 48 operable within diverter housing 50. Feed line 42 and dispensing channels 44, 46 are opened to diverter housing 50. Diverter member 48 operates within diverter housing 50 to selectively connect feed line 42 relative to dispensing channels 44, 46 for filling dispensing chambers 30, 32 in cooperation with dispensing cycles for assemblies 12, 14. A motor 51 operates the diverter member 48 within the diverter housing 50. Operation of the motor 51 is coupled to the system controller 20. Diverter member 48 may be operated within diverter housing 50 by any mechanical or electro-mechanical system, and preferably is operated via a rotary motor.

As shown, preferably, the feed device 26 is a portioning type feed assembly which continuously supplies material from reservoir 52 to feed line 42 at a selected rate. Material is fed from reservoir 52 via rotating feed members, including feed rollers 56, 58 and gear wheels 60, 62, operable within the reservoir 52 for metering and dispensing material to feed line 42. Feed rollers 56, 58 and gear wheels 60, 62 operate continuously to move product along a feed path to dispensing chambers 30, 32. As shown schematically, feed rollers 56, 58 and gear wheels 60, 62 are operated by servo-type actuator assemblies 64, 66 coupled to the system controller 20 to provide synchronous operation. Assemblies 64, 66 may be any mechanical or electro-mechanical assembly which provides rotary motion to feed rollers 56, 58 and gear wheels 60, 62. Although a preferred embodiment of a feed device 26 described includes feed rollers 56, 58 and gear wheels 60, 62, it should be understood that any number or design of rotating feed members may be used.

The discharge rate of material from the feed device 26 to feed line 42 is controlled via the rotation cycle of feed rollers 56, 58 and gear wheels 60, 62. Material is preferably supplied to reservoir 52 from hopper 68 through supply line 70 via pump 72 (shown schematically), which preferably is a dual piston pump. Pump 72 is coupled to the system controller 20 for synchronized operation. In one embodiment, a pressure control valve 74, operably coupled to the system controller 20, is included on supply line 70 to control the pressure of material pumped from hopper 68 to feed device 26. Although a particular feed assembly is described, it should be understood that application of the invention is not limited to the particular feed device or pump described.

For operation, diverter member 48 rotates a complete 360° within diverter housing 50 to fill or feed material to the first and second dispensing assemblies 12, 14 as progressively illustrated in FIGS. 2A–2H (arrow 76). Ends of diverter member 48 are labeled "1" and "2" to illustrate the complete 360° rotation of diverter member 48. Preferably, rotation of diverter member 48 is continuous so that diverter member 48 does not pause, stop/start, or reset. Diverter member 48 rotates within diverter housing 50 to form diverter channels through which material flows from feed line 42 to dispensing channels 44, 46. Depending upon the position of diverter member 48, material is supplied from feed line 42 through diverter channels in diverter housing 50 to dispensing channels 44, 46 to fill dispensing chambers 30, 32. While dispensing chambers 30, 32 are being filled, material is not dispensed. When the position of the diverter member 48 restricts flow to dispensing channels 44, 46 (and dispensing chambers 30, 32) material is dispensed from dispensing chambers 30, 32 via plungers 34, 36 under operation of controller 20. During the 360° rotation, each dispensing assembly 12, 14 has two filling and dispensing cycles.

In a preferred embodiment of the invention, the width (or diameter) of feed line 42 and dispensing channels 44, 46 is greater than an area or thickness (indicated by double arrow 49 in FIG. 6) of diverter member 48 that faces the opening of the feed line 42. This design provides an overlap in the filling cycles of the dispensing assemblies 12, 14, as schematically illustrated in FIGS. 2A, 2C, 2E, 2G, where both dispensing chambers 30, 32 are simultaneously filled. Since there is an overlap in the filling cycles, there is an interruption in the dispensing cycles of dispensing assemblies 12, 14, since neither dispensing assembly 12, 14 can dispense material during the period where both dispensing assemblies 12, 14 (dispensing chambers 30, 32) are being filled. However, an overlap can also be obtained for a diverter having a width equal to or greater than the opening of the feed line 42 if a suitable bypass mechanism is used. For instance, the bypass mechanism can have valves and/or suitable passageways that are synchronized with the position of the diverter to allow continuous flow through the feed line 42.

Figure 2A:
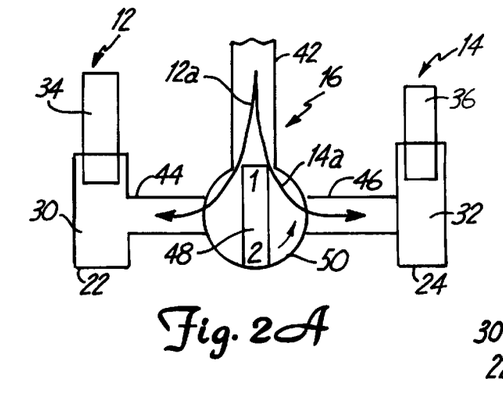
FIGS. 2A–2H are schematic illustrations of operation of a diverter assembly for selectively filling first and second dispensing assemblies of a depositor apparatus for dispensing product to a conveyor system.
Figure 2B:
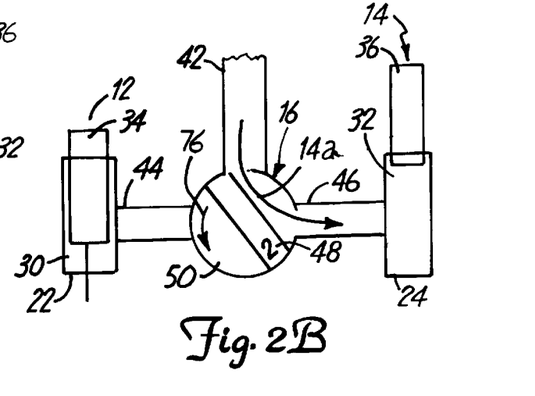
Figure 2C:
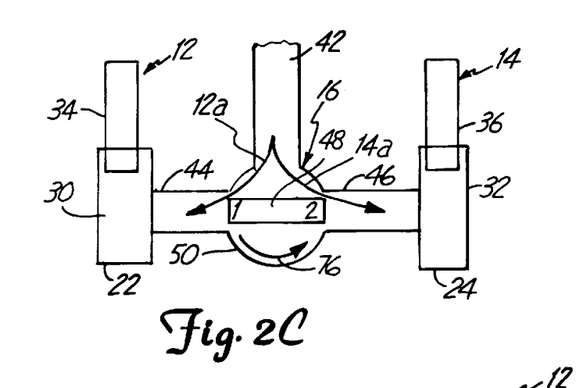
Figure 2D:
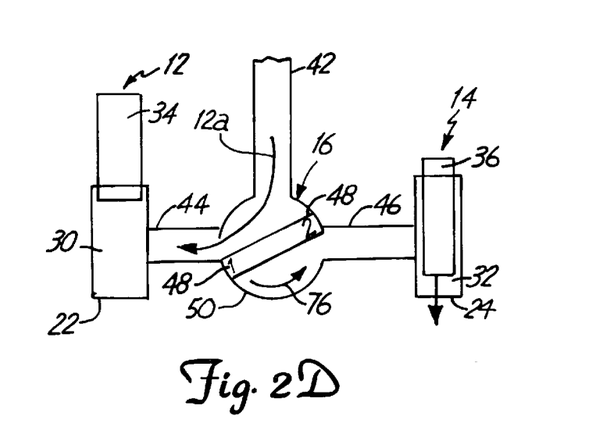
Figure 2E:
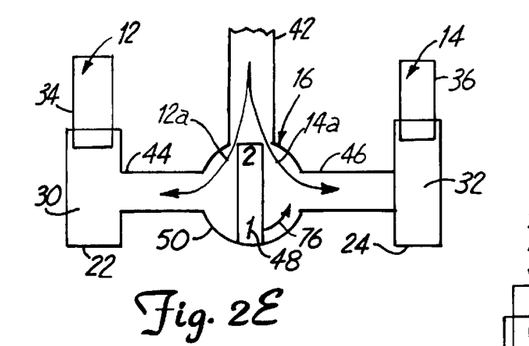
Figure 2F:
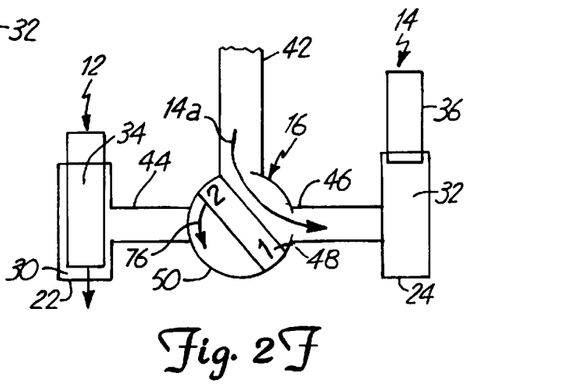
Figure 2G:
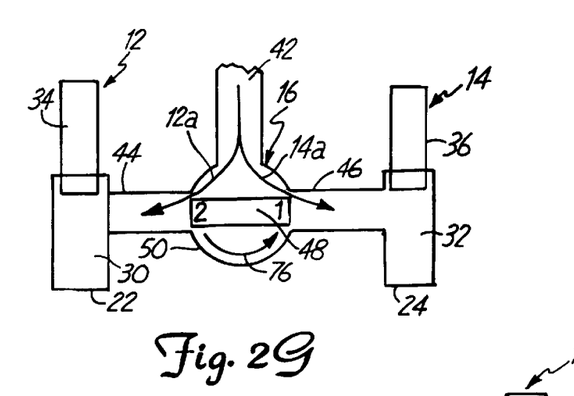
Figure 2H:
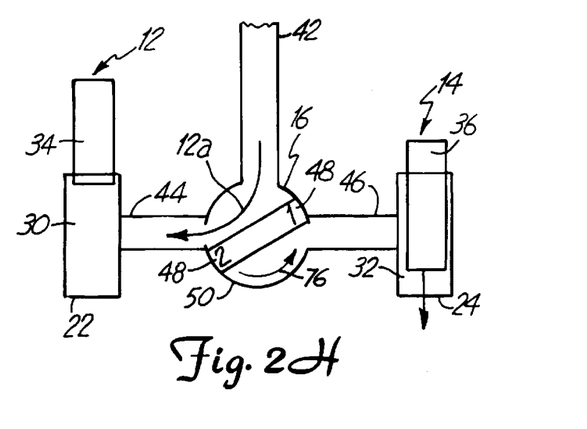

In the embodiment illustrated in FIGS. 2A–2H, at least one dimension of diverter member 48 is sized smaller than feed line 42 and dispensing channels 44, 46. Thus, when the diverter member 48 is aligned longitudinally with feed line 42, as illustrated in FIGS. 2A and 2E, and aligned transversely with dispensing channels 44, 46, as illustrated in FIGS. 2C and 2G, both dispensing chambers 30, 32 are filled as illustrated by arrows 12a and 14a. While diverter member 48 moves between the positions shown in FIGS. 2A–2C and FIGS. 2E–2G, dispensing chamber 32 is being filled as illustrated by arrow 14a and while diverter member 48 moves from the positions shown in FIGS. 2C–2E and 2G–2A, dispensing chamber 30 is being filled, as illustrated by arrow 12a.

Figure 3A:
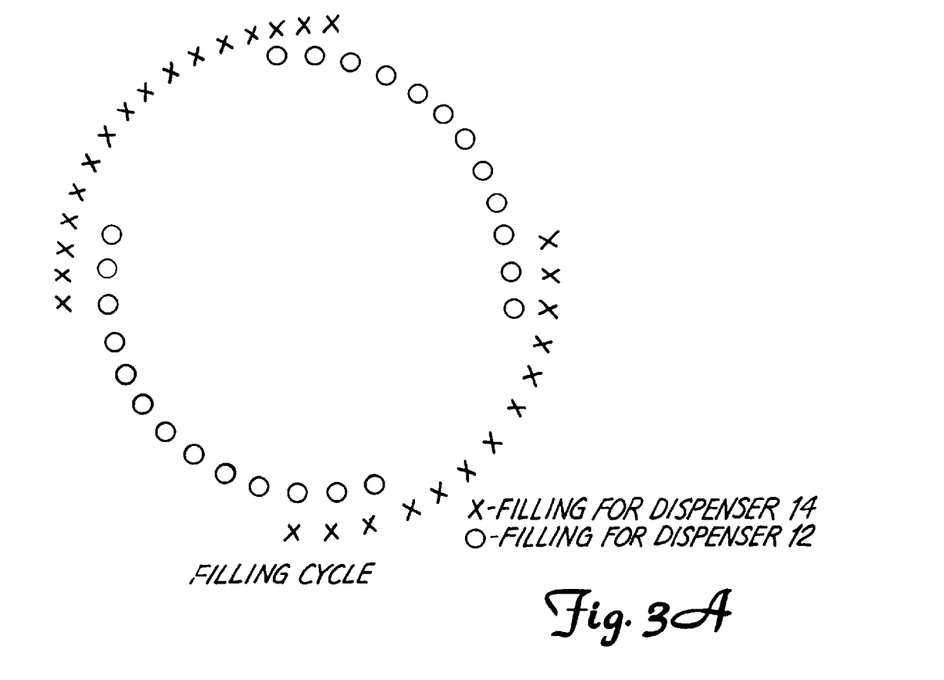
FIG. 3A is an illustrative view of filling cycles of an embodiment of the first and second dispensing assemblies via diverter assembly illustrated in FIGS. 2A–2H.
Figure 3B:
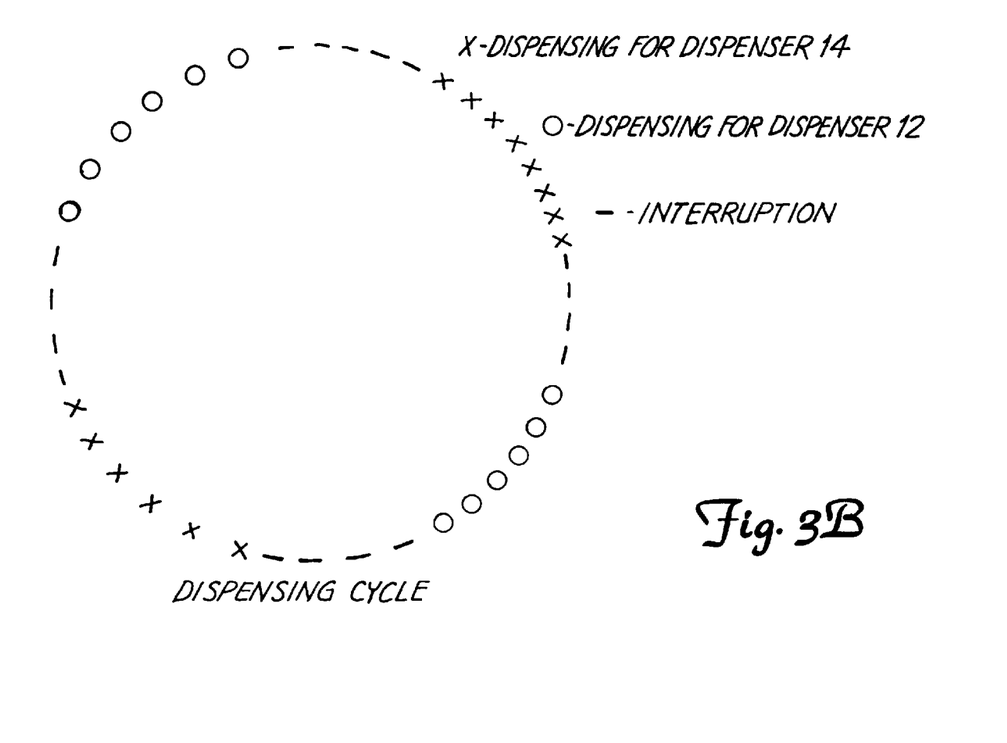
FIG. 3B is an illustrative view of dispensing cycles of the first and second dispensing assemblies of FIG. 3A.

FIG. 3A diagrammatically illustrates filling cycles of dispensing chambers 30, 32 having a filling overlap where the filling cycle for dispensing assembly 12 is represented by O and the filling cycle for dispensing assembly 14 is represented by X. During the filling overlap, neither of dispensing chambers 30, 32 dispenses; and, thus, there is an interruption in dispensing, as illustrated diagrammatically in FIG. 3B where the dispensing cycle for dispensing assembly 12 is represented by O; the dispensing cycle for dispensing assembly 14 is represented by X; and an interruption in dispensing is represented by -.

Thus, as described in the embodiment of the diverter assembly 16, illustrated in FIGS. 2A–2H and 3A, during the rotation of diverter member 48 within diverter 50, one or both of the dispensing chambers 30 or 32 is being filled so that material continuously flows from the feed device 26 through the passages of the depositor apparatus for discharge. Since material flow is continuous, and not interrupted, the flow viscosity of the material is maintained. When flow is interrupted, material must overcome static friction to commence flow, which results in more turbulent flow during the dispensing cycle due to constant flow starts and stops. The continuous flow design is particularly useful for dispensing flowable food product having particulates, where it is desirable that the particulates remain whole and that the particulates not be broken, dispersed or mixed during the dispensing process. The continuous flow design provides more laminar flow and reduces turbulent flow, which reduces particulate damage. Alternate filling devices may be used which provide continuous flow for filling the first and second dispensing assemblies and the invention is not limited to the particular embodiment shown.

Alternatively, if the thickness 49 of diverter member 48 were sized similar to or larger than feed line 42 and dispensing channels 44, 46 so that when the diverter member 48 is aligned longitudinally or transversely (FIGS. 2A, 2C, 2E, 2G), diverter member 48 restricts flow from feed line 42 to dispensing channels 44, 46, the system would have a discontinuous feed or filling cycle. Thus, during a complete rotation of the diverter member 48 within the diverter housing 50, there would be four feed or filling interruptions. However, in such an arrangement, continuous dispensing could take place from the dispensing chambers 30, 32 since there is no overlap in the filling cycle to delay dispensing from the dispensing chambers 30, 32. Thus, in such a design, the dispensing functions of the first and second dispensing assemblies 18, 20 may be closely timed to provide a continuous dispensing system. It should be understood that the rotation direction of the valve member 48 is shown for illustrative purposes only, and that any rotation direction may be used.

Figure 4:
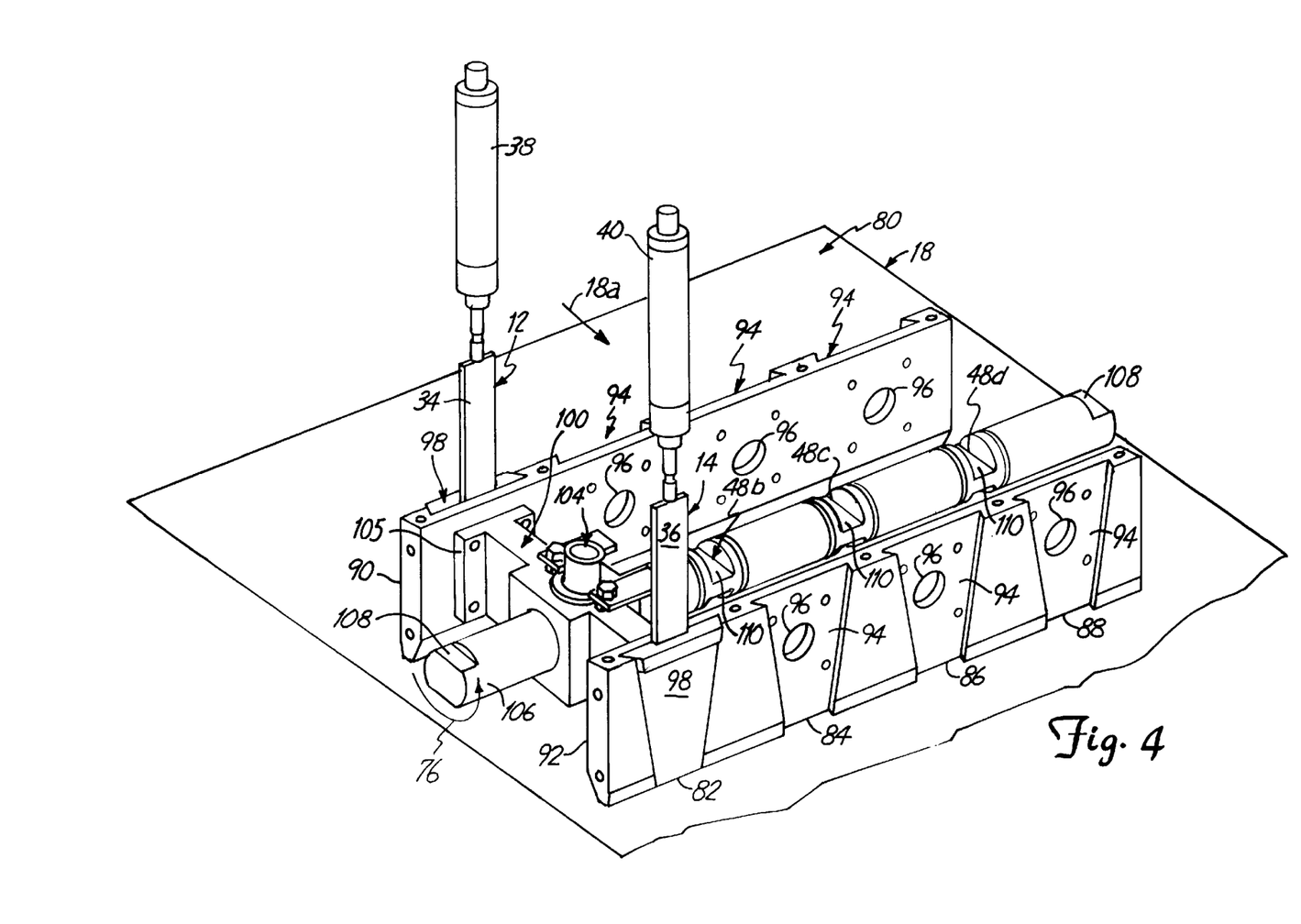
FIG. 4 is a perspective view of an embodiment of a depositor apparatus having a plurality of dispensing lanes including first and second dispensing assemblies.

FIG. 4 illustrates incorporation of first and second dispensing assemblies of the present invention into a multilane dispensing apparatus 80. As shown, the multilane apparatus 80 includes a plurality of dispensing lanes 82, 84, 86, 88 extending transversely along the axis perpendicular to the conveyor path or direction 18a of operation. (Each dispensing lane 82, 84, 86, 88 includes dispensing assemblies 12, 14. Although four lanes 82, 84, 86, 88 are shown, any number of lanes may be used, depending upon the width of the conveyor system 18. As shown, the multilane dispensing apparatus 80 includes spaced elongated line banks 90, 92, which extend transversely to the conveyor path. Line banks 90, 92 are coupled to a support structure of the depositor apparatus 10 (not shown) and are supported thereby relative to the conveyor system 18.

Figure 5:
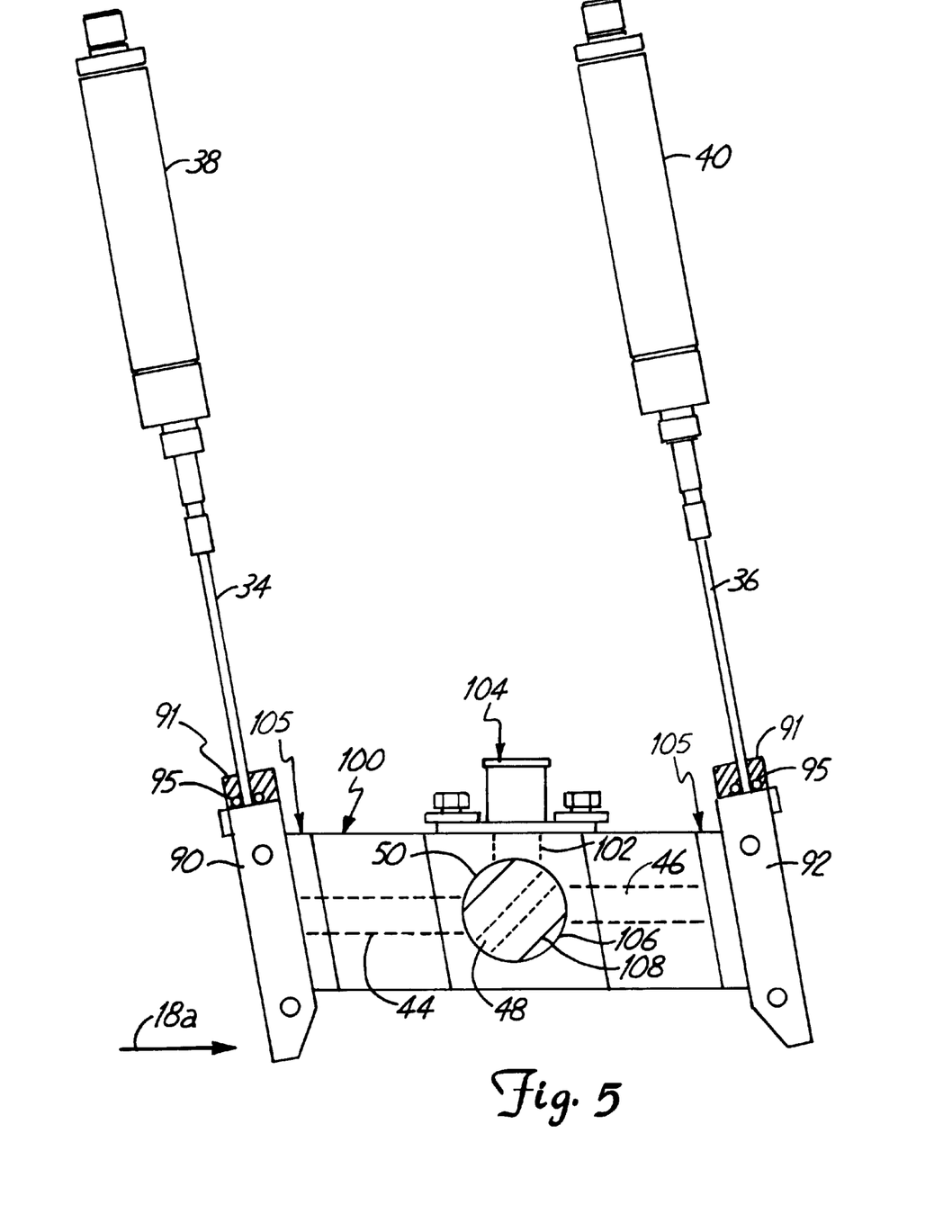
FIG. 5 is an end view of the depositor apparatus shown in FIG. 4.

Lanes 82, 84, 86, 88 are spaced along line banks 90, 92. In particular, line banks 90, 92 include a plurality of transversely spaced recesses 94 having dispensing ports 96. Chamber blocks 98 removably fit into recesses 94 on line banks 90, 92 to form dispensing chambers 30, 32, as will be explained. Referring to FIGS. 4 and 5, the chamber blocks 98 are secured within recesses 94 via a retainer plate 91 secured above line banks 90, 92 with bolts (not shown) threaded into the plates 91 to hold o-rings 95 in place around each plunger 34, 36. The removable chamber block 98 design allows different chamber blocks 98 to be selectively mounted into recesses 94 of line blocks 90, 92 to provide various sized and shaped dispensing chambers 30, 32. Additionally, the removable chamber block 98 design allows the dispensing chambers 30, 32 to be easily washed and cleaned.

Diverter blocks 100 connect line banks 90, 92 at lanes 82, 84, 86, 88 (only diverter block 100 at lane 82 shown). As shown in FIG. 5, diverter housing 50 and dispensing channels 44, 46 are formed in diverter block 100. Diverter block 100 includes an input channel 102 which couples to feed line 42 (not shown) via an in-feed spool 104 to define a source line for supplying material from the feed device. Diverter block 100 is coupled to line banks 90, 92 to align channels 44, 46 with dispensing ports 96, opened to dispensing chambers 30, 32 as will be explained. Diverter blocks 100 are coupled to line banks 90, 92 via mounting flanges 105, by known fasteners. The multilane apparatus 80 includes a diverter shaft 106 as shown in FIG. 4. Diverter members 48a–d are formed along diverter shaft 106 at spaced intervals for alignment within diverter housings 50 formed in diverter blocks 100. Diverter shaft 106 is continuously rotated during operation in a uniform direction, to selectively feed material so that there is no residual motion loss due to directional changes or stops or starts of the diverter shaft 106. Preferably, each of the diverters 48a–d is formed in the same position on the diverter shaft 106 to allow coordinated usage with a single controller. As illustrated in FIG. 5, dispensing assemblies 12, 14 preferably are tilted in order to reduce product smearing at the discharge point.

Preferably, in the multilane apparatus 80, a multilane feed or portioning device is used to simultaneously feed material to the plurality of dispensing lanes 82, 84, 86, 88. In the embodiment illustrated, the multilane portioning device includes a plurality of feed rollers operable in segregated reservoirs 52 via a single shaft. Product is discharged from dispensing chambers 30, 32 via plungers 34, 36 coupled to the system controller 20, as previously explained. It should be understood that the depositor system of the present invention is not limited to the particular feed assembly shown and that various other arrangements may be used to dispense material to the first and second dispensing assemblies 12, 14.

Figure 6:
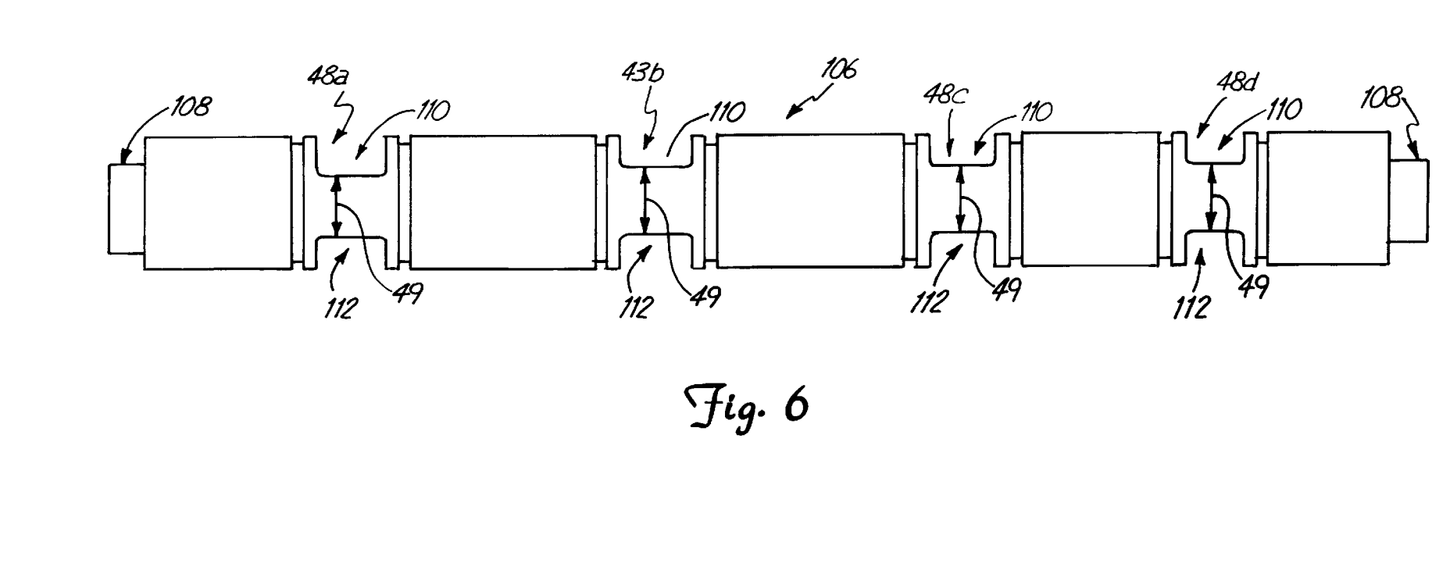
FIG. 6 is a plan view of a diverter shaft including a plurality of diverter members.
Figure 7:
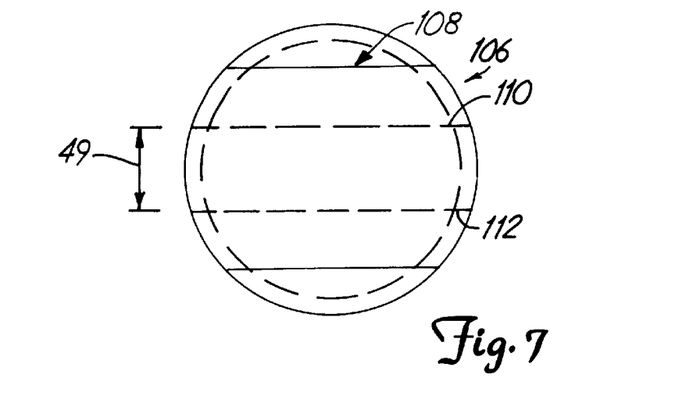
FIG. 7 is an end view of the diverter shaft of FIG. 6.

FIG. 6 is a plan view of diverter shaft 106, and FIG. 7 is an end view of diverter shaft 106. Diverter shaft 106 is an elongated cylindrical member having spaced diverter members 48a–d formed therealong and flat ends 108. Flat ends 108 facilitate rotation of the diverter shaft 106 via motor 51 (shown schematically in FIG. 1). Diverter members 48a–d are planar members formed of opposed recessed generally flat sides 110, 112, which form diverter channels when diverter members 48 are housed in diverter housing 50. In one embodiment, the thickness 49 between opposed sides 110, 112 is less than the width of feed line 42 and less than the width of dispensing channels 44, 46 to provide the filling overlap during the rotation cycle of diverter shaft 106 as discussed previously. As previously explained, this results in the continuous flow of material through the depositor apparatus 10. It should be understood that the diverter shaft 106 is not limited to the particular embodiment shown.

As described, the spaced dispensing chambers 30, 32 provide a dispensing system with coordinated dispensing and filling. Preferably, the dispensing chambers 30, 32 include a uniformly shaped dispensing chamber and plunger operable therein to maintain a consistent profile while material is dispensed. The present invention may be used to dispense product with particulates, and in particular flowable food product where it is desired that the particulates remain whole and not be broken, mixed, or dispersed. Thus it is desirable to have a dispensing chamber 30, 32 with a constant profile to eliminate abrupt shape changes to reduce turbulence or discontinuous flow which might lead to particulate damage.

Figure 8:
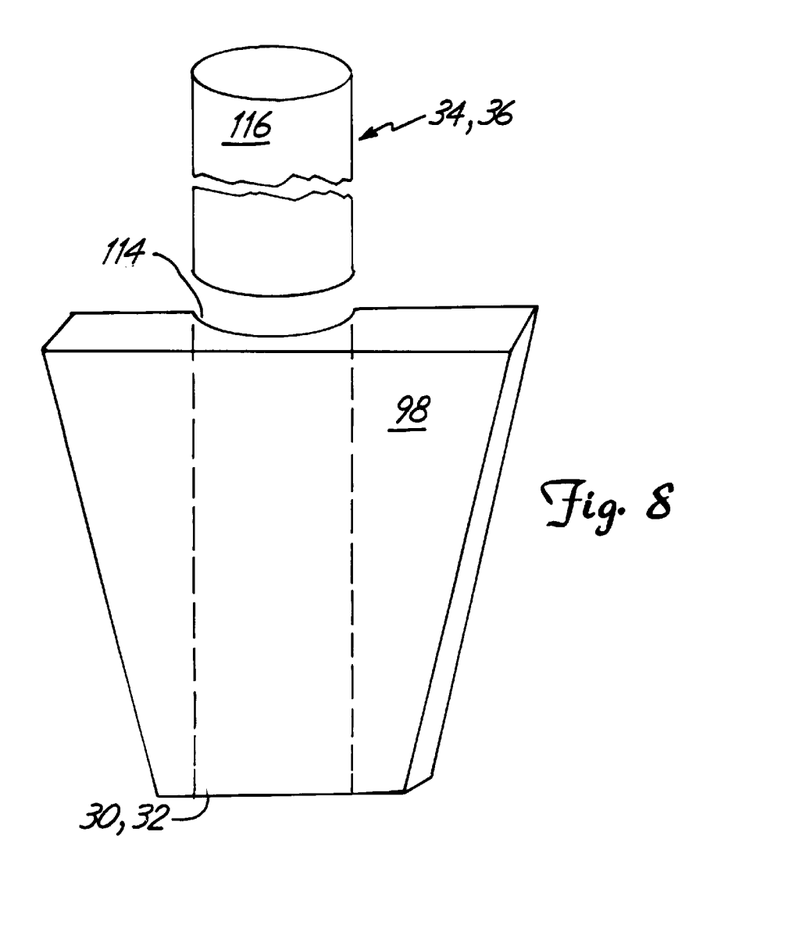
FIG. 8 is a perspective view of a chamber block having a chamber recess adapted to form a dispensing chamber having a plunger operable within said dispensing chamber.

FIG. 8 is a perspective view of one embodiment of chamber block 98, which is formed of a rigid member having a generally oblong, oval-shaped chamber recess 114 on a back surface of the chamber block 98. When chamber blocks 98 are inserted into recesses 94 of line banks 90, 92, the surfaces of recess 94 and oval-shaped recess 114 cooperatively form oval-shaped dispensing chambers 30, 32, which are opened to channels 44, 46 via dispensing port 96. In one embodiment, as shown, plungers 34, 36 are formed of elongated members 116 having a generally oblong, oval-shaped cross-section which fit slidably with chambers 30 and 32.

The plunger is designed for operation within the elongated, oval-shaped chambers 30, 32 to be operated between a retracted position and a dispensing position for dispensing product. The rounded edges of the oval-shaped chambers 30, 32 and plungers 34, 36 provide a desired shape for dispensing product. The cross-sectional area of the oblong, oval-shaped chambers 30, 32 is preferably constant. In particular, the oblong oval shape provides a desired shape for dispensing material with less particulate damage. However, it should be understood that the shape of the dispensing chamber 30, 32 is not limited to an oval-shape and that the dispensing chamber 30, 32 can be rounded or rectangular in shape.

Figure 9:
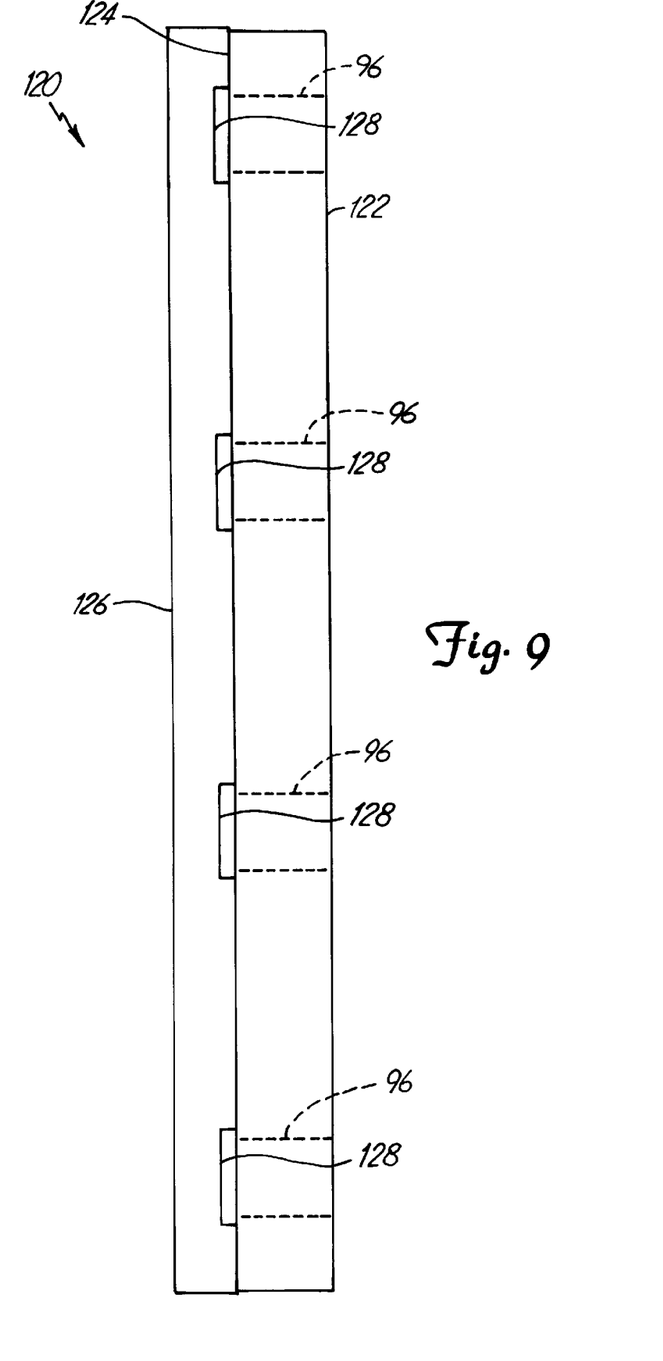
FIG. 9 is a top plan view of an alternative dispensing assembly.

An alternative assembly 120 for forming the dispensing chambers 30, 32 is illustrated in FIG. 9. The assembly 120 includes a line bank 122 having a substantially smooth mounting face 124. Dispensing ports 96 are formed in the line bank 122 and are open to the mounting face 124. A plate 126 mounts to the mounting surface 124 and includes recessed channels 128 that form the dispensing chambers.

The distance between dispensing outlets of line banks 90, 92 (or first and second dispensing assemblies 12, 14) is referred to as head pitch HP as illustrated in FIGS. 10A–10E. Product dimensions (i.e. length or thickness) are generally a function of conveyor speed, plunger speed, plunger and chamber dimensions, and diverter speed and head pitch HP. Maximum product length PL is restricted by the head pitch HP between the first and second dispensing assemblies 12, 14 (or line banks 90, 92) due to the spaced dispensing relation between dispensing assemblies 12, 14. The maximum product length which can be dispensed is limited to half of the HP (HP/2).

Figure 10:
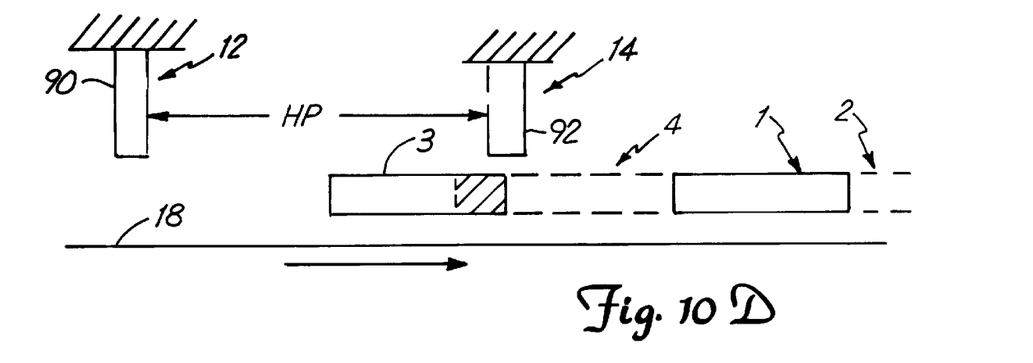
FIGS. 10A–10E sequentially illustrate operation of first and second dispensing assemblies to dispense product to a conveyor system.
Figure 10A:
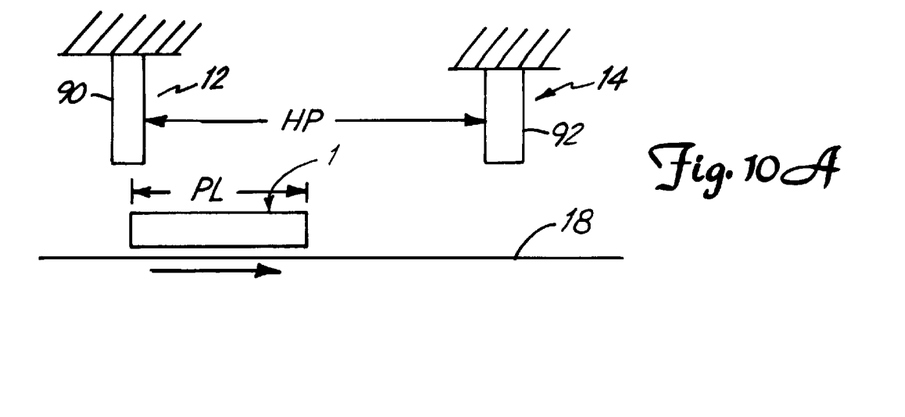
Figure 10B:
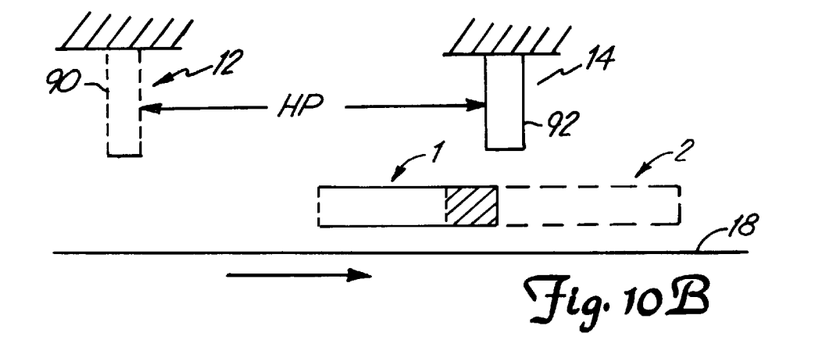
Figure 10C:
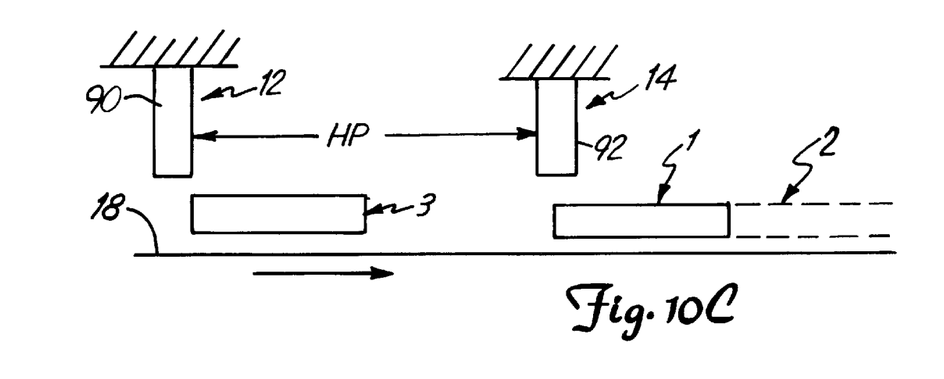

FIGS. 10A–10E illustrate multiple dispensing cycles for dispensing assemblies 12, 14 dispensing discrete product units. Dispensing assembly 12 dispenses product identified by a solid line (—) and dispensing assembly 14 dispenses product identified by a dotted line (---). Assemblies 12, 14 continuously operates to intermittently dispense product to a moving conveyor 18 as illustrated in FIGS. 10A–10E. In particular, FIG. 10A illustrates commencement of operation where dispensing assembly 12 dispenses a first product unit (illustrated by No. 1). Subsequent product units (Nos. 2–n where n is any number of product units) are dispensed as illustrated in FIGS. 10B–10E. As illustrated in FIGS. 10B and 10D, if product length PL is greater than HP/2, overlapping product will be dispensed to the conveyor 18 by dispensing assemblies 12, 14 as illustrated in cross section. Thus, product length can vary according to $0 \leq PL \leq HP/2$, based upon the operating parameters of the system (i.e. conveyor speed, diverter speed and plunger speed).

Figure 11:
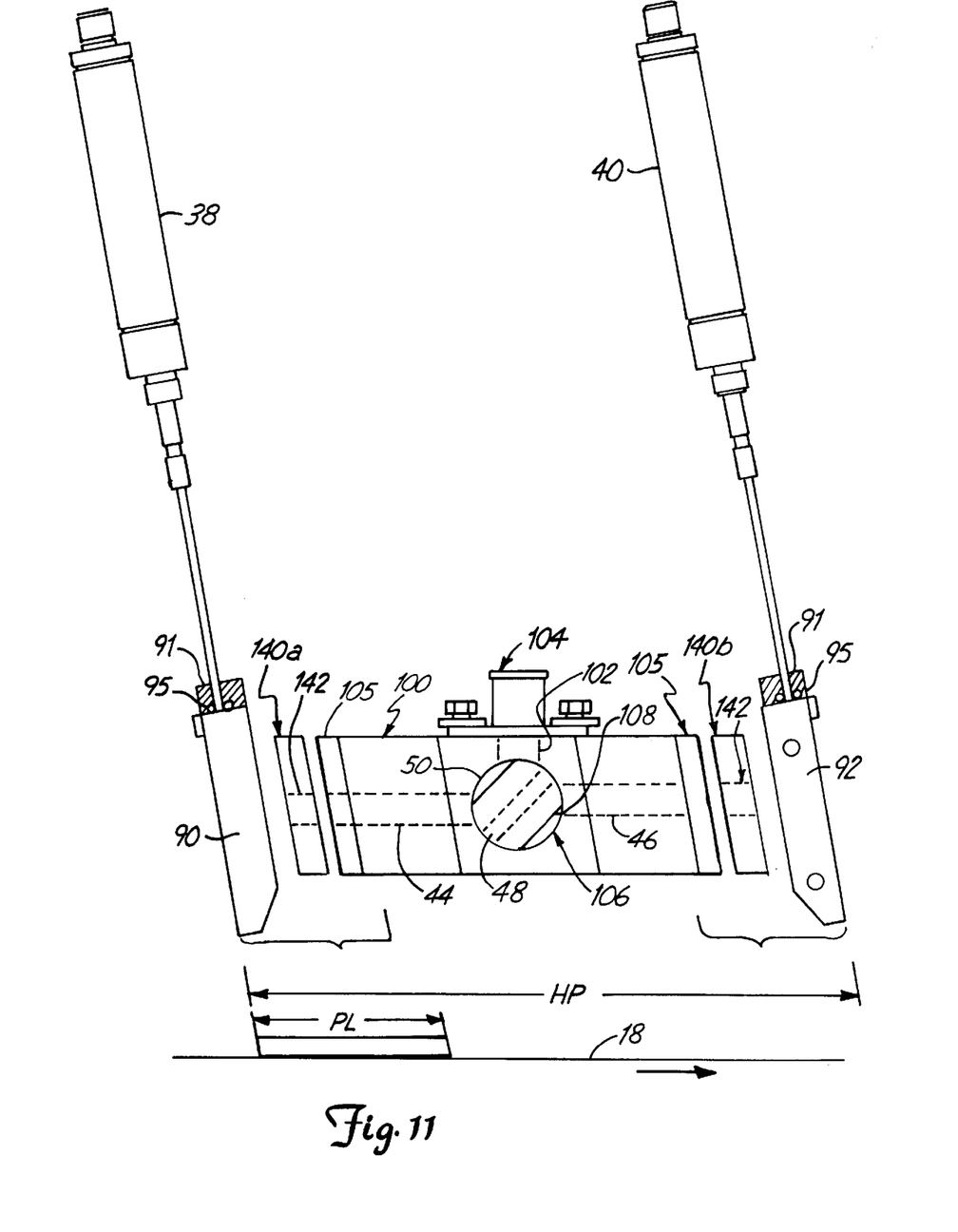
FIG. 11 is an end view of an alternate embodiment of the depositor apparatus shown in FIGS. 4–5.

Alternately, the operating parameters of the dispensing system (i.e. plunger speed and diverter speed) may be adjusted to dispense an alternate product pattern where the maximum product length varies according to $0 \leq PL \leq HP/4$. In either operation, the maximum product length may be adjusted by changing the dimension HP. FIG. 11 illustrates an embodiment of a depositor apparatus having insert blocks 140a–b adapted to removably connect between diverter block 100 and line banks 90, 92 to vary head pitch HP. As shown, insert blocks 140a–b include channels 142 which operably couple to channels 44, 46 and openings 96 (FIG. 9) to provide a flowable connection to chambers 30, 32. Separate insert blocks 140a–b may be used for each line bank 90, 92 so that the distance between diverter member 48 and line banks 90, 92 is the same. It must be noted that the change in head pitch can be accomplished by using only one insert block 140. All that matters is that the head pitch HP be changed by an appropriate distance, and it does not matter if diverter assembly 16 is not centered between dispensing assemblies 12, 14.

Thus, as described in the present invention, spaced dispensers define multiple spaced dispensing outlets along the conveyor path provide for enhanced capacity for a depositor apparatus. Although the present invention has been described with reference to preferred embodiments, workers skilled in the art will recognize that changes may be made in form and detail without departing from the spirit and scope of the invention.

What is claimed is:

1. A depositor apparatus comprising:
   a first dispenser having a first feed inlet and a first dispensing outlet the first dispenser operating between a filling cycle and a dispensing cycle to dispense material;
   a second dispenser having a second feed inlet and a second dispensing outlet spaced from the first dispensing outlet the second dispenser operating between a filling cycle and a dispensing cycle to dispense material;
   a device for supplying material from a material source during the filling cycle of the first and second dispensers, in the filling cycle, the first and second feed inlets being opened to the material source for filling the dispensers and the first and second feed inlets being closed in the dispensing cycles of the first and second dispensers; and
   a device for opening and closing first and second feed inlets for filling the first and second dispensers in between alternating dispensing cycles of the respective first and second dispensers.

2. The depositor apparatus of claim 1 wherein material is continuously supplied from the material source.

3. The depositor apparatus of claim 1 wherein the device for supplying material from the material source to the first and second dispensers comprises;
   a diverter assembly having a diverter member coupled to a source line and first and second feed inlets and operable within a diverter housing to open and close the first and second feed inlets to the source line to fill the first and second dispensers.

4. The depositor apparatus of claim 3 wherein a thickness of the diverter member is sized smaller than the source line and and first and second feed inlets so that material is continuously supplied from the material source line to at least one of the first and second dispensers.

5. The depositor apparatus of claim 3 wherein the diverter member is adapted to rotate a full revolution within said diverter housing to thereby fill the first and second dispensers twice during a revolution of the diverter member.

6. The depositor apparatus of claim 3 wherein the diverter member continuously rotates in a single direction during operation of the depositor apparatus.

7. The depositor apparatus of claim 3 wherein the diverter member is formed of a planar member having substantially flat sides operable within the diverter housing.

8. The depositor apparatus of claim 3 wherein the diverter assembly includes a diverter block having a diverter housing and an input channel coupled to the material source.

9. The depositor apparatus of claim 8 wherein a plurality of spaced diverter members are formed along a diverter shaft, said diverter members are spaced to align with the diverter housing of diverter blocks of the multilane depositor apparatus.

10. The depositor apparatus of claim 1 wherein the device for supplying material from a material source to the first and second dispensers includes:

a plurality of rotating feed members operable within a feed reservoir.

11. The depositor apparatus of claim 1 wherein the first and second dispensers include a dispensing chamber having a dispensing plunger operable therein for dispensing material, operation of said dispensing plungers being controlled to provide reciprocal operation of the first and second dispensers.

12. The depositor apparatus of claim 11 wherein the dispensing chamber is formed of a base and a removable chamber block, said removable chamber block being operably coupled to the base to form the dispensing chamber.

13. The depositor apparatus of claim 11 wherein the plunger and dispensing chamber are formed of an oblong oval shape.

14. The depositor apparatus of claim 11 wherein the dispensing chamber and dispensing outlet have a relatively straight dispensing path having a constant cross-sectional area along the length thereof.

15. The depositor apparatus of claim 1 and further comprising a conveyor for receiving the dispensed material.

16. The depositor apparatus of claim 15 wherein the depositor apparatus includes a plurality of spaced-apart dispensing lanes to form a multilane depositor apparatus, each of said dispensing lanes including first and second dispensers.

17. The depositor apparatus of claim 16 wherein each dispensing lane includes a diverter assembly operably connected to the first and second dispensers, wherein a thickness of each diverter member is sized smaller than the source line and and first and second feed inlets so that material is continuously supplied from the material source line to at least one of the first and second dispensers.

18. The depositor apparatus of claim 16 wherein the multilane depositor apparatus includes first and second spaced line banks, the line banks including a plurality of removable chamber blocks spaced therealong, said removable chamber blocks and line banks forming dispensing chambers of first and second dispensers.

19. The depositor apparatus of claim 1 wherein the depositor apparatus includes a plurality of spaced-apart dispensing lanes to form a multilane depositor apparatus, each of said dispensing lanes including first and second dispensers.

20. The depositor apparatus of claim 1 wherein the depositor apparatus is adapted to dispense a flowable food product.

21. The depositor apparatus of claim 1 wherein the first and second dispensing assemblies deposit separate spaced products having a product length PL and the distance between the spaced first and second dispensing assemblies defines a head pitch HP wherein the HP dimension affects product length PL.

22. The depositor apparatus of claim 21 wherein the length of the diverter block is adjustable to change head pitch HP between the first and second dispensing assemblies.

23. A method for dispensing material comprising the steps of:

providing a first dispenser having a first feed inlet and a first dispensing outlet and a second dispenser having a second feed inlet and a second dispensing outlet spaced from the first dispensing outlet, said first dispenser and second dispenser operating between a filling cycle and a dispensing cycle to dispense material;

filling the first and second dispensers with material from a material source; and reciprocally dispensing material from the closed first and second dispensers.

24. The method of claim 23 and including the step of continuously supplying material to at least one of said the first or second dispensers from the material source.

25. The method of claim 24 wherein the step of filling includes diverting the material from the material source to the first and second dispensers.

26. The method of claim 24 wherein the step of filling includes diverting the material from the material source to the first and second dispensers, and wherein the step of reciprocally dispensing includes dispensing material onto a conveyor.

27. The method of claim 21 wherein the step of closing includes rotating a diverter member.

28. The method of claim 27 wherein the step of filling includes filling the first and second dispensers twice with each revolution of the diverter member.

* * * * *